June 5, 1962    P. R. FECHHEIMER ETAL    3,037,536
PRESSURE FILLING APPARATUS WITH VACUUM LEVEL CONTROL
Filed March 6, 1959    4 Sheets-Sheet 3
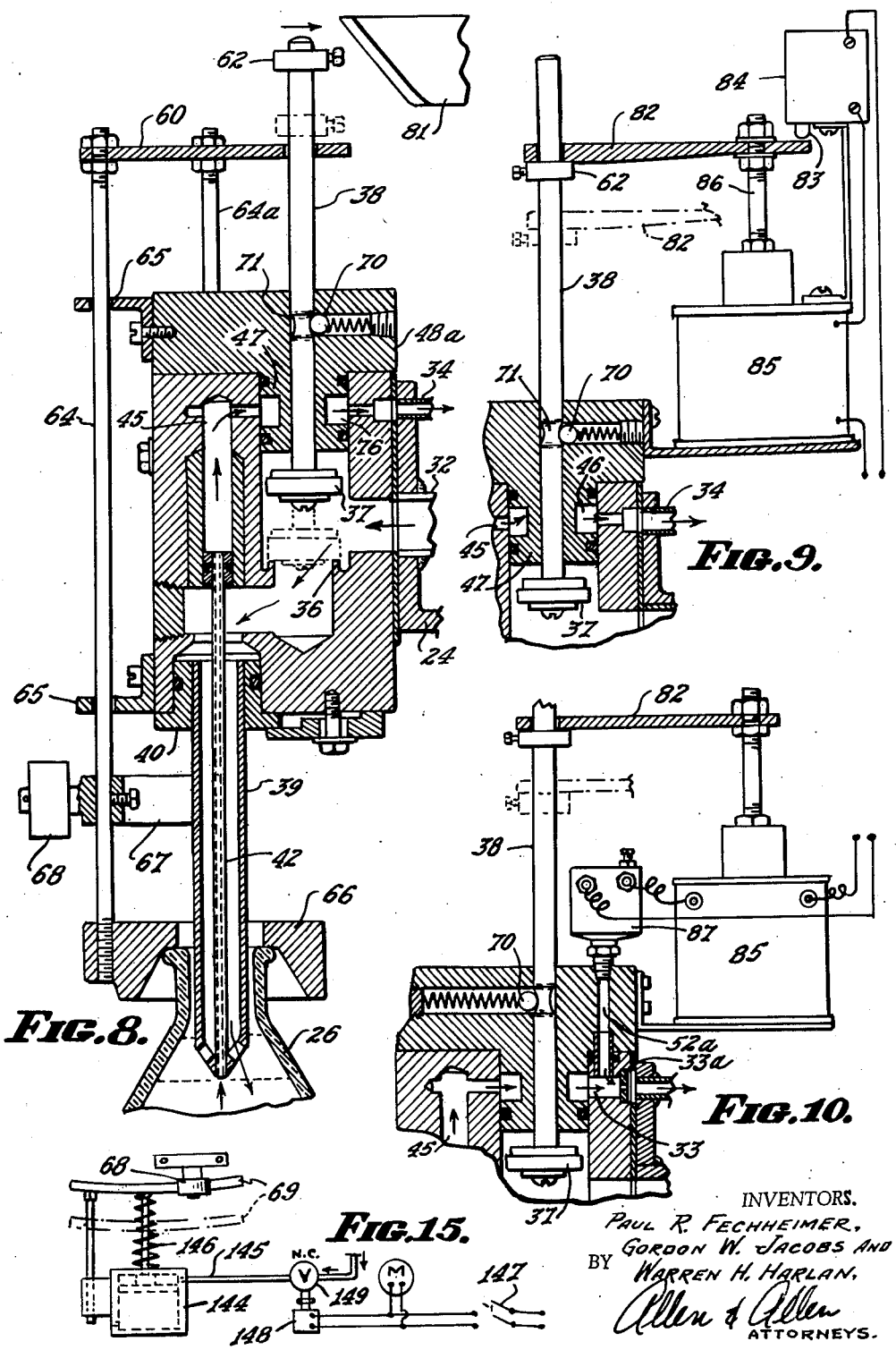
INVENTORS.
PAUL R. FECHHEIMER,
GORDON W. JACOBS AND
BY WARREN H. HARLAN,
ATTORNEYS.

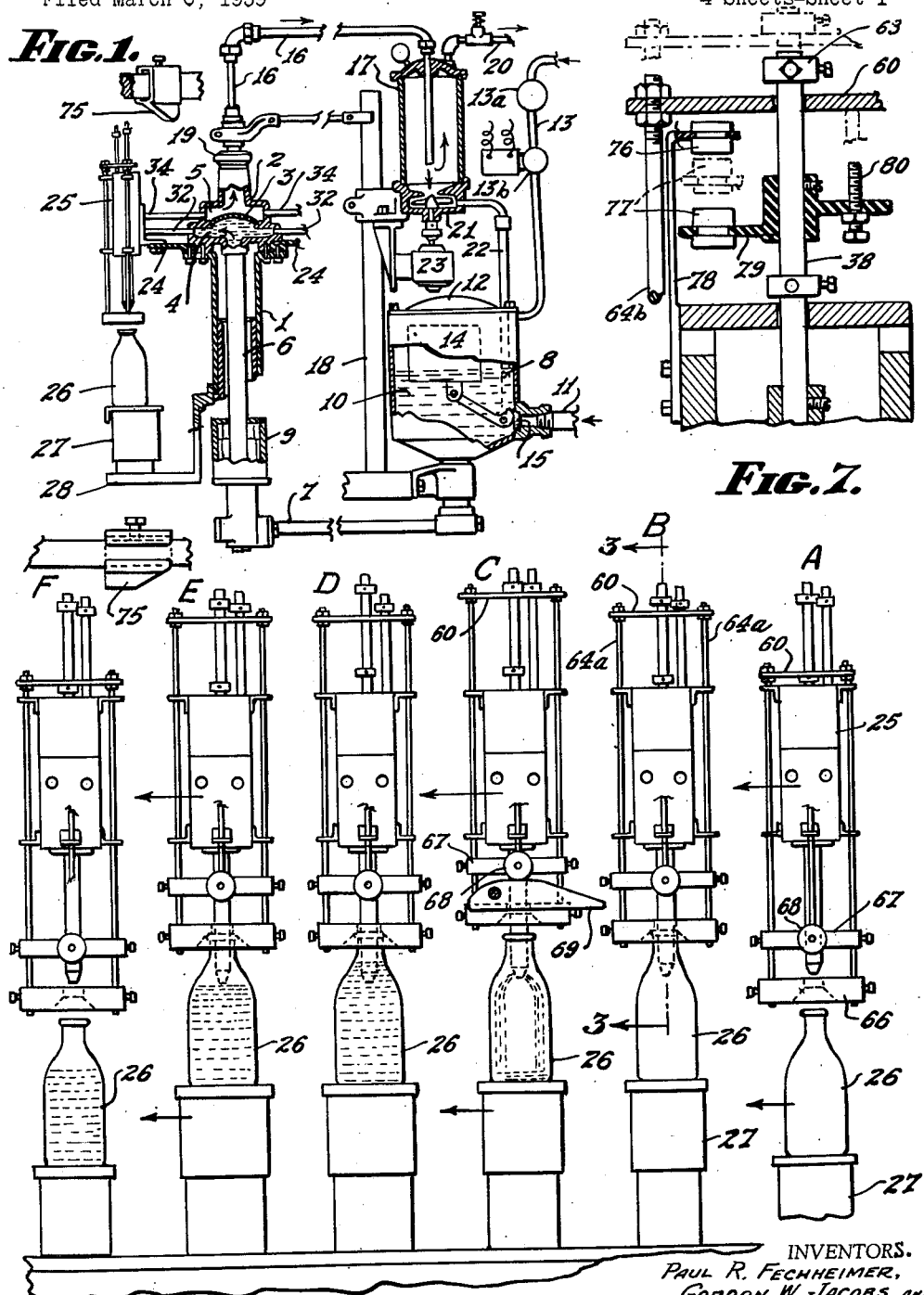

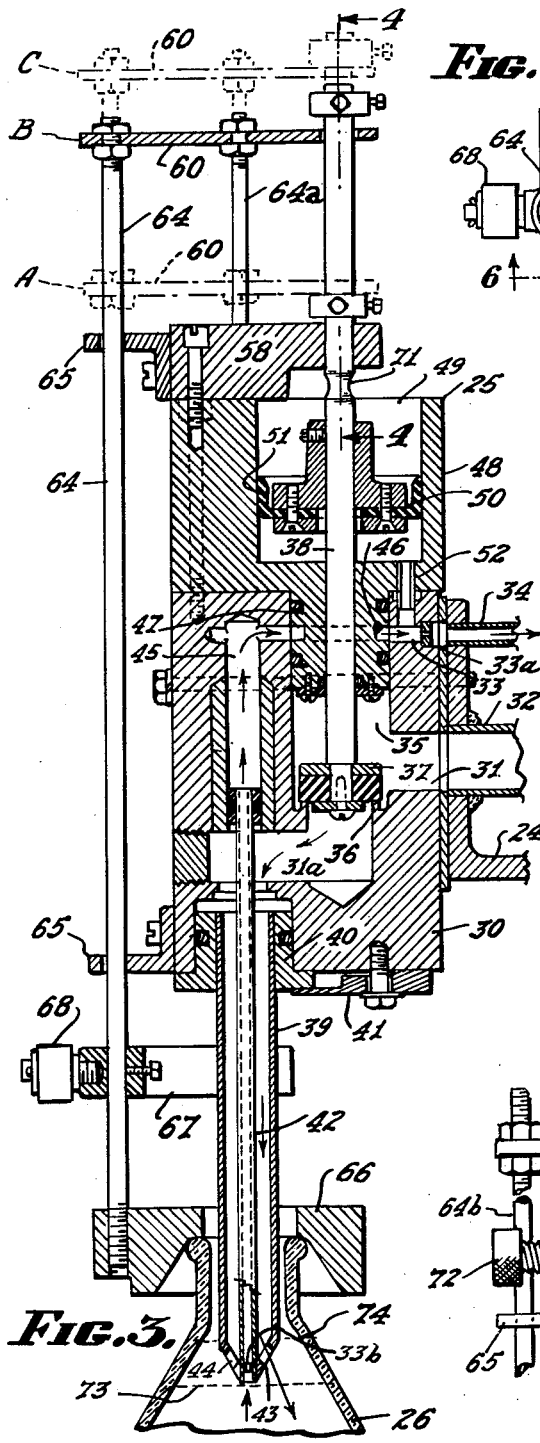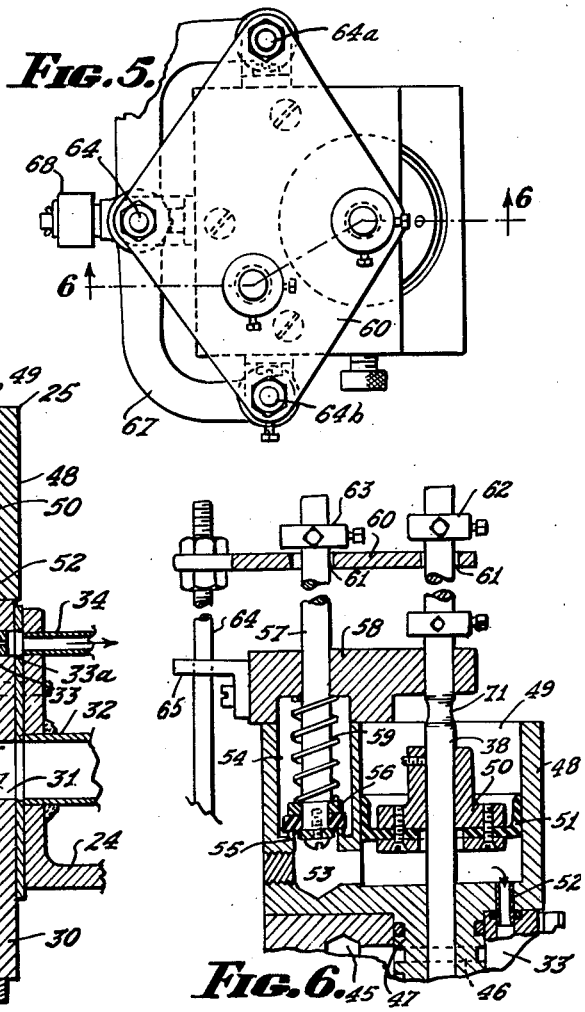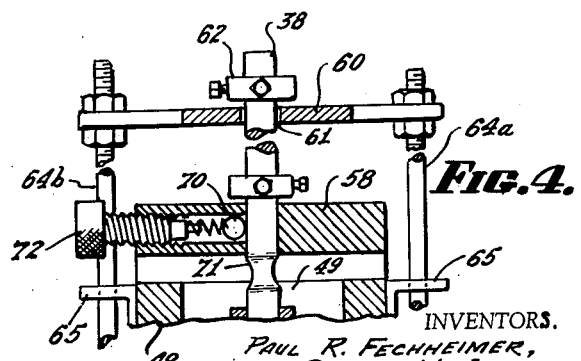

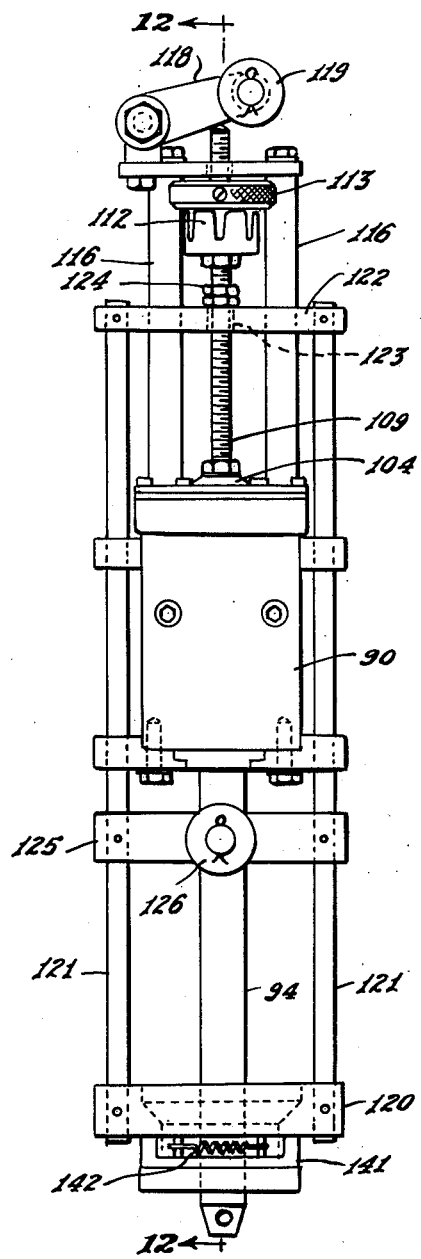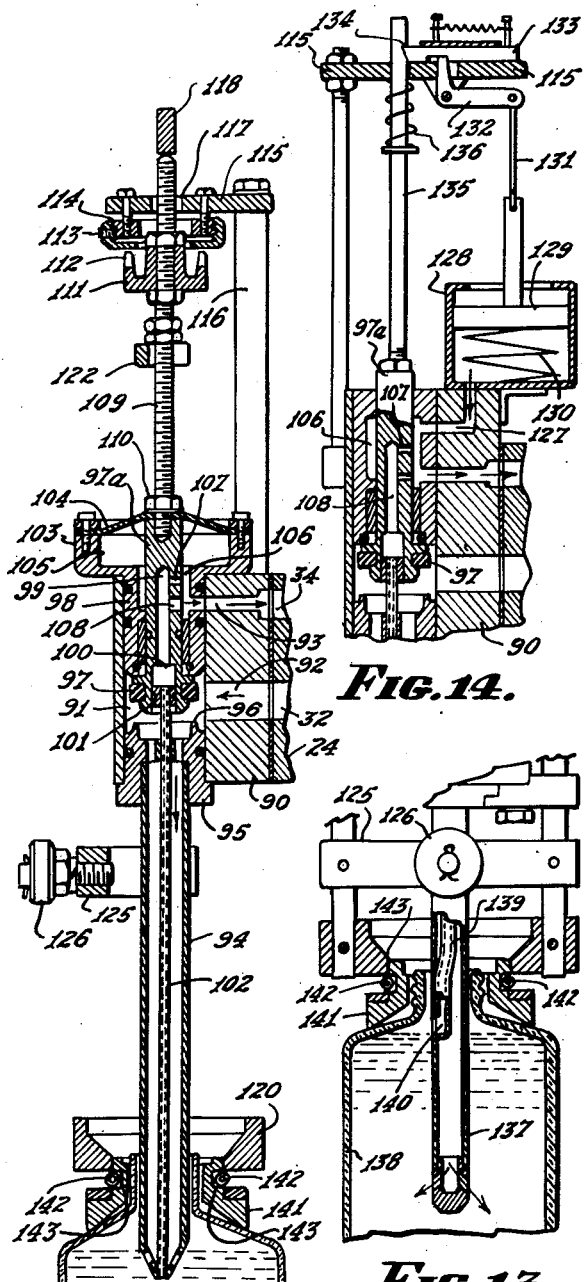
FIG. 11. FIG. 12. FIG. 13. FIG. 14.
INVENTORS.
PAUL R. FECHHEIMER,
GORDON W. JACOBS, AND
BY WARREN H. HARLAN,
ATTORNEYS.

United States Patent Office 3,037,536
Patented June 5, 1962

3,037,536
PRESSURE FILLING APPARATUS WITH
VACUUM LEVEL CONTROL
Paul R. Fechheimer, Gordon W. Jacobs, and Warren H. Harlan, Cincinnati, Ohio, assignors to The Karl Kiefer Machine Company, Cincinnati, Ohio, a corporation of Ohio
Filed Mar. 6, 1959, Ser. No. 797,738
19 Claims. (Cl. 141—7)

This invention relates to machines for filling containers by introducing a product into the containers through a filling spout or nozzle and relates more specifically to apparatus for accurately controlling the level to which the containers are filled.

In Fechheimer Patent, 2,660,357, dated November 24, 1953 and entitled, "Pressure-and-Vacuum Filling Machine," a filling machine and nozzle construction is disclosed in which both super-atmospheric pressure and vacuum are employed to effect rapid filling of the containers. In this system, a seal is provided about the mouth of the container to draw a vacuum on it, whereupon the filling material is introduced under a pressure greater than atmospheric. While such devices have been highly successful for filling rigid containers, such as glass bottles or metal cans, considerable difficulty has been experienced in the filling of flexible containers, such as plastic squeeze bottles, in that, due to their shape and construction, they do not readily lend themselves to being sealed during filling. That is, the bottles or containers tend to distort and buckle when sealing pressure is applied to the sealing member of the filling spout structure, with the result that the necessary tight seal cannot be obtained. This problem is specifically referred to in Fechheimer Patent 2,660,358, dated November 24, 1953 and entitled, "Filling Head for Filling Machines," wherein the pressure against the top of the containers was reduced by using a special form of sealing member which applied only the minimum force necessary to effect a seal between the spout structure and the mouth of the container. While this device has proven successful for certain types of flexible containers, there are nevertheless other types of containers which resist accurate filling by either of the aforementioned devices.

Accordingly, a principal object of the instant invention is the provision of pressure-vacuum filling apparatus by means of which the containers, particularly flexible containers, may be accurately filled without subjecting the containers to either pressure or vacuum. That is, the filling is done with the mouths of the containers open so that neither pressure nor vacuum can be built up in them and yet both pressure and vacuum are utilized to effect a rapid and accurate fill.

A further object of the invention is the provision of an improved filling spout structure which may be used in conjunction with the basic pressure-vacuum filling machine disclosed in the aforementioned Fechheimer patents, the product being introduced into the container under a pressure greater than atmospheric and vacuum or suction utilized to accurately control the level of fill.

Still a further object of the invention is the provision of apparatus of the character described in which a vacuum tube forming part of the filling spout structure is utilized to sense the level of fill and shut-off the product flow when the desired level has been reached.

The foregoing objects together with other objects of the invention which will appear hereinafter or which will be apparent to the skilled worker in the art upon reading these specifications, are accomplished by those construction and arrangement of parts of which several exemplary embodiments will now be described.

Reference is first made to the accompanying drawings wherein:

FIGURE 1 is a partial elevation with parts in section of filling apparatus to which the invention is addressed.

FIGURE 2 is a schematic drawing illustrating successive positions assumed by the filling spout structure during the filling cycle.

FIGURE 3 is an enlarged vertical sectional view taken along the line 3—3 of FIGURE 2.

FIGURE 4 is a fragmentary sectional view taken along the line 4—4 of FIGURE 3.

FIGURE 5 is a plan view of the filling spout structure shown in FIGURE 3.

FIGURE 6 is a fragmentary sectional view taken along the irregular line 6—6 of FIGURE 5.

FIGURE 7 is a fragmentary sectional view similar to FIGURE 4 but showing an alternate means for maintaining the product valve in open position.

FIGURE 8 is a vertical sectional view similar to FIGURE 3 but illustrating a modified form of filling spout structure.

FIGURE 9 is a fragmentary elevation with parts in section illustrating a modification of the device shown in FIGURE 8.

FIGURE 10 is a fragmentary elevational view with parts in sections illustrating another modification of the invention.

FIGURE 11 is an elevational view of still another form of filling spout structure incorporating a vacuum responsive diaphragm.

FIGURE 12 is a vertical sectional view taken along the line 12—12 of FIGURE 11.

FIGURE 13 is a fragmentary elevational view with parts in section illustrating an alternate form of filling stem wherein the product and vacuum outlets are at different levels.

FIGURE 14 is a fragmentary elevational view with parts in section and illustrating a modified form of vacuum responsive valve closing means.

FIGURE 15 is a diagrammatic view illustrating movable cam means for the spout structures.

Reference is first made to FIGURE 1 of the drawings which illustrates a pressure-vacuum filling machine comprising a central rotating column 1 mounting at its upper end a main head 2 having a hollow interior divided by a diaphragm 3 into a product chamber 4 and a vacuum chamber 5. The product chamber 4 is connected by a vertical conduit 6 to a conduit 7 leading to a product supply tank 8. The connection between conduits 6 and 7 is through a gland 9 which permits the vertical conduit 6 to rotate with the column 1.

The supply tank 8 containing product 10 is arranged to be supplied by a conduit 11 from a suitable source of supply, which is not shown. Since a super-atmospheric pressure of air is to be built-up in the supply tank 8, it is closed by a cover 12; and air under pressure may be introduced into the supply tank through pipe 13 which may be provided with a pressure regulating valve 13a and a cut-off valve 13b, the latter being solenoid actuated and wired to the motor circuit for the machine drive so that the valve will be open only when the filling machine motor is running. A float 14 may be provided in the supply tank to operate a valve 15 which prevents overfilling and maintains the supply tank at a substantially constant level of fill. It will be understood that the product will be supplied through the conduit 11 at a pressure sufficient to overcome the internal pressure in the supply tank.

The vacuum chamber 5 in the main head 2 is connected by a conduit 16 to a vacuum chamber and trap 17 which may be conveniently mounted on a standard 18 forming a part of the machine frame. A gland 19 permits rotation of the main head relative to the conduit 16. The vacuum chamber and trap 17 is connected by a pipe 20 to a vacuum source, which is not shown. Any product drawn into the vacuum side of the machine will be separated from the air stream in the vacuum chamber and trap 17 and will be returned to the supply tank 8 by means of a pump 21 at the bottom of the trap, the pump being connected through conduit 22 to the supply tank. The pump is driven by a motor 23 and will develop a head in excess of that within the supply tank.

The main head 2 is provided with bracket means 24 which mount a plurality of filling spout structures 25 which are radially disposed about the main head in position to coact with containers 26 seated on movable lift platforms 27 mounted on a rotatable table 28 secured to column 1. During each rotative cycle of the machine, the containers 26 will be delivered to the lift platforms 27, and, as the machine rotates, the lift platforms will be sequentially raised to juxtapose the containers to the spout structures, and upon the completion of the fill, the containers will be lowered by the lift platforms and then removed from the machine for subsequent capping or the like.

As best seen in FIGURES 3 through 6, a first embodiment of the filling spout structures 25 comprises a body block 30 adapted to be secured to the bracket means 24 supported by the main head 2. The body block has a passageway 31 therein which is connected to the product chamber 4 of the main head by means of a conduit 32. Similarly, a passageway 33 in the block is connected to the vacuum chamber 5 by means of a vacuum conduit 34. The product passageway 31 opens inwardly into a vertical bore 35 terminating at its lower end in a valve seat 36 adapted to be closed by a valve element 37 axially movable in the bore 35 by means of an upwardly projecting valve stem 38. A continuation 31a of the product passageway lies beneath the valve seat and is in communication with the upper end of a filling stem 39 which has a fitting 40 by means of which it is secured in the undersurface of body block 30, as by means of a clamping member 41.

A vacuum tube 42 is centrally disposed within the filling stem 39, the two tubes terminating in a nose 43 which is adapted to enter the mouth of a container to be filled, the product flowing outwardly through a plurality of openings 44 surrounding the free end of the vacuum tube. At its upper end the vacuum tube communicates with a vertical passageway 45 in the body block, which passageway is connected to vacuum passageway 33 by means of an annular channel 46 formed in a plug portion 47 fitted in the upper end of bore 35. Preferably, the plug 47 is formed as an integral part of a second body block 48 in which the valve stem 38 is mounted for axial movement. The body block 48 has an enlarged cylindrical chamber 49 surrounding the valve stem 38, and a piston 50 is secured to the valve stem and arranged to make sliding contact with the wall surfaces of chamber 49. The piston 50 is provided with a piston cup 51 which makes air tight contact with the cylindrical wall surfaces of chamber 49. A branch passageway 52 extends between the lower end of chamber 49 and vacuum passageway 33.

As best seen in FIGURE 6, a lateral passageway 53 is in communication with the chamber 49 at a point beneath the piston 50, the passageway opening into a chamber 54 through a valve seat 55 adapted to receive a valve element 56 mounted on a stem 57 which projects upwardly through the chamber 54 and is mounted for axial movement in a third body member 58. A spring 59 surrounds the valve stem 57 and urges the valve 56 against its seat 55. The chamber 54 is vented in some fashion to the outside air. This may be done simply by not sealing the chamber relative to the third body member 58, or a vent passageway may be provided, if desired.

The valve stems 38 and 57 are adapted to be raised and lowered by means of a lift plate 60 having openings 61 therein through which the upper ends of the valve stems freely pass, the ends of the valve stems lying beyond the plate 60 being provided with adjustable collars 62 and 63, respectively. The plate 60 is supported by a series of three lift rods 64, 64a and 64b mounted in brackets, such as the brackets 65, secured to the body blocks of the filling structure. At their lower ends the rods mount a centering bell 66 which surrounds the filling stem 39 and is positioned to be contacted by a container presented to the filling stem. The rods also mount a yoke 67 (FIGURES 3 and 5) having a cam follower 68 which, as will be pointed out in greater detail hereinafter, is adapted to be contacted by a cam element 69 (FIGURE 2) lying in the path of travel of the filling spout structures as they are rotated through the filling cycle.

The operation of the filling spout structure just described can be best understood by referring first to the rightmost diagram shown in FIGURE 2 of the drawing and marked A, which illustrates the position of the spout structure at the start of the filling cycle. As seen therein, the container is positioned on the lift platform 27 and lies beneath the centering bell 66 which is in its lowermost position. When in this position, the lift plate 60 overlies the uppermost portion of the body block, as also shown in dotted lines in FIGURE 3 and indicated by the letter "A." The valve 37 is closed, i.e. seated against valve seat 36; the piston 50 is in its lowermost position; the valve 56 (FIGURE 6) is closed, i.e. seated against valve seat 55; and a vacuum is being drawn on vacuum stem 42 by reason of its connection to vacuum chamber 5 through passageway 45, annular channel 46, passageway 33 and vacuum conduit 34. A vacuum is also drawn on chamber 49 through branch passageway 52, the vacuum serving to draw piston 50 downwardly and hence maintain valve 37 firmly against its seat.

As the lift platform 27 raises the container to the position illustrated at B in FIGURE 2, the mouth of the container will first contact the centering bell and the container will be aligned with respect to the filling spout. The upward movement of the container causes the lift rods 64, 64a and 64b to move the lift plate 60 upwardly so that it approaches the collars 62 and 63 but does not raise them. At the same time, the filling stem 39 enters the mouth of the container where its lower end will establish the desired height of fill. The mouth of the container is open and air may readily flow into it.

The filling of the container is initiated by the cam member 69 which, as it is contacted by the cam roller 68, lifts the rods 64, 64a and 64b, and hence the cam plate 60, to the position illustrated in diagram C. As the lift plate 60 begins to move upwardly, it first contacts the collar 63 fixed to valve stem 57. In this connection, it will be noted from FIGURES 2 and 6 that collar 63 is slightly below collar 62 and hence will be contacted first. As the plate contacts the collar 63, it lifts the stem 57 and unseats valve 56. Air in chamber 54 is thus permitted to enter chamber 49. The purpose in doing this is to prevent vacuum build-up in chamber 49 as the piston 50 is moved upwardly. Such vacuum build-up would cause the product to be drawn from vacuum conduit 33 into chamber 49 where it might act to foul the piston cup 51 of piston 50. The venting of chamber 49 also reduces the vacuum tending to hold piston 50 in its lowermost position and hence frees the piston and its stem 38 for upward movement. The continued upward movement of plate 60 causes it to engage collar 62 and raise the now freed piston 50 and valve stem 38, thereby unseating valve 37 and permitting the product to flow into passageway 31a and hence into the filling stem and the container therebeneath.

Once the valve stem 38 has been raised to its uppermost position, it will be secured in such position by a releasable locking means such as the spring pressed ball 70 (FIGURE 4) which is adapted to engage the relieved portion 71 of valve stem 38. The pressure on the ball 70 may be adjusted by means of the thumb screw 72 so as to overcome the vacuum drawn on the under side of piston 50 through the branch passageway 52. That is, once the valve has been opened, the cam follower 68 drops off cam 69 and the lift plate and centering bell will move downwardly to the position shown in diagram D wherein the centering bell is in contact with the mouth of the container and the plate 60 has released the valve stem 57 for closing movement under the influence of its spring 59. The portion of chamber 49 lying beneath the piston 50 thus resealed and vacuum will be again drawn thereon through branch passageway 52. However, as already indicated the vacuum at this stage is insufficient to overcome the holding force of ball 70 and hence the valve stem 38 remains in its raised position and the product continues to flow through passageways 31 and 31a to the filling stem.

When, however, the product level in the container reaches the free end of the vacuum tube, as indicated by the dotted line 73 in FIGURE 3, the supply of air to the vacuum tube will be effectively shut-off by the product as it seeks to enter the tube and this will create a vacuum surge, i.e. an increase in vacuum, in the various vacuum passageways and the vacuum drawn on the underside of piston 50 will become sufficient to overcome the force exerted by ball 70 and the piston will be drawn downwardly, thereby closing the valve 37 and shutting-off the flow of product to the filling stem. Thus, the pressure drop in vacuum tube 42 is used to sense the fill of the container and shut-off the product flow, the parts now assuming the position shown in diagram E.

In order to create the desired pressure drop or vacuum surge, it has been found desirable to restrict the size of passageway 33 in proportion to the cross-sectional area of vacuum tube 42. This may be conveniently done by placing a restrictor bushing 33a (FIGURE 3) in the vacuum passageway 33 and a corresponding restrictor bushing 33b at or near the bottom of vacuum tube 42. If the two openings are substantially the same size and length on the opening in bushing 33a smaller than bushing 33b there will be low vacuum in the chamber 49 as long as air is flowing through the vacuum passageways, but there will be a sufficient build-up of vacuum to effect the closing of the product valve when the product reaches the free end of the vacuum tube.

Since the shut-off of the product flow does not occur instantaneously, i.e. a short time interval is required to build up the vacuum surge, a slight overfill is produced, such as that indicated in FIGURE 3 by the dotted line 74. This overfill is highly desirable since it assures that each container has received more than the required amount of product. The overfill is then removed through the vacuum tube, the material passing through the vacuum chamber 5 and into the vacuum trap 17 where it is returned to the supply tank in a manner which has already been explained. It will be understood that the filling stem remains in container 26 in the position E for a length of time sufficient for the overfill to be evacuated and the product level returned to the fill line 73. Thereafter, as shown in diagram F, the filled container will be lowered away from the filling spout structure for subsequent removal from the lift platform; and as the container is lowered, the centering bell will move downwardly to return the parts to their initial position.

The construction just described insures positive filling of the containers and also incorporates safety features to prevent accidental discharge of the product. For example, if no container is present on the platform 27, the centering bel will remain in its lowermost position (diagram A) and the cam follower 68 will not be in position to be contacted by the cam member 69; and the product valve will remain closed. Similarly, in the event that insufficient product has been introduced into the container by the time it is to be lowered by the lift platform, a cam member 75 (FIGURES 1 and 2) is positioned to contact and move the valve stem 38 to the closed position. Such cam has been found to be particularly useful when starting up the machine since most products have a greater tendency to foam at that time due to air in the various conduits and passageways. Even after the machine is in full operation and the foaming has subsided, the cam 75 nevertheless assures that the product valves are fully closed.

In FIGURE 7 there is illustrated an alternative means for maintaining the product valve in open position until the vacuum surge causes the piston 50 to close the valve. In this instance, the spring pressed ball 70 is replaced by a pair of magnets 76 and 77, the former being supported by brackets 78 secured to the filling spout body and the latter mounted on a fitting 79 secured to the valve stem 38. A stop screw 80 is secured to the fitting 79 so that the spacing between the magnets 76 and 77 may be accurately adjusted, thereby varying their holding power.

FIGURE 8 illustrates a modification of the invention wherein the product valve is closed by a cam member 81 which is similar to the cam member 75, and wherein the piston 50 has been eliminated. While this embodiment of the invention utilizes the open fill under pressure greater than atomspheric and the vacuum tube to establish the predetermined height of fill, a mechanical valve closing means is substituted for the vacuum sensing means of the embodiment of FIGURE 3. This arrangement greatly simplifies the construction of the body element 48a and hence reduces the cost of the filling spout structures. In this instance the product valve 37 will be held open for a pre-determined length of time which will be controlled by the speed of the machine and the location of cam 81. Should the machine be stopped for any reason with one of more of the product valves open product flow nevertheless will be stopped because the pressure on the product in supply tank 8 will be cut-off by the solenoid valve 13b in supply line 13 (FIGURE 1).

FIGURE 9 illustrates a modification of the spout structure of FIGURE 8 wherein the collar 62 on valve stem 38, when moved upwardly, serves to raise an arm 82 which contacts and closes the actuating button 83 of a time delay switch 84. Upon the passage of the predetermined time interval which is correlated to the speed of rotation of the filling machine, the switch 84 acts to energize a solenoid 85 the plunger 86 of which is connected to the arm 82 and serves to move the cam downwardly to the position illustrated in the dotted lines, thereby closing the valve 37 and hence shutting-off the product flow.

FIGURE 10 illustrates another modification of the invention wherein the vacuum surge in vacuum passageway 33 acts through a branch passageway 52a to actuate a vacuum responsive switch 87 which in turn actuates the solenoid 85 and causes the arm 82 to move the valve stem 38 to its lower position and thereby close valve 37 and cut-off the flow of product. In this modification, as in the modification illustrated in FIGURE 3, the vacuum side of the machine is used to sense the fill and shut-off product flow when a predetermined level has been reached.

FIGURES 11 and 12 illustrate still another modification of the invention wherein the head 90 has a single vertical bore 91 extending therethrough with a product passageway 92 and a vacuum passageway 93 opening into the bore. A filling stem 94 is fitted in the lower end of the bore 91 by means of a fitting 95 the upper end of which defines a valve seat 96 adapted to receive a valve element 97 vertically movable in a sleeve 98 fitted in the upper end of the bore.

The valve 97 has an elongated upwardly projecting body 97a in which a vertically disposed vacuum passageway 99 is formed, the passageway having an enlarged lower end 100 which slidably receives a gasket 101 mounting the upper end of vacuum tube 102, the vacuum tube projecting downwardly through the filling stem 94, as will be readily apparent. With this arrangement, the valve 97 may be moved from closed to open position without interrupting the flow of vacuum through the vacuum tube.

At its upper end, the sleeve 98 flares outwardly in a cup-shaped number 103 closed at its top by a diaphragm 104, thereby defining a vacuum chamber 105 which is in communication with the vacuum passageway 93 through an annular passageway 106 surrounding valve body 97a. Vacuum passageway 99 in the valve body is also in communication with annular passageway 106 through port 107. A second port 108, which is of larger area than port 107, is also in communication with annular passageway 106 when the valve 97 is in open position.

A threaded rod 109 projects upwardly from valve body 97a, the rod extending through the center of diaphragm 104 and carrying a nut 110 which secures the diaphragm to the valve 97a in an air-tight seal. Near its upper end the rod 109 adjustably mounts a magnetic member 111 having a plurality of fingers 112 which are of opposite polarity, the fingers projecting upwardly for contact with a non-magnetic thumb screw 113 which is in threaded engagement with a magnetic core member 114 secured to a bracket 115 mounted on a supporting post 116 which may be conveniently secured at its lower end to head 90. The upper end of rod 109 passes freely through an opening 117 in the bracket 115 where it may be contacted by arm 118 pivotally mounted on the bracket and carrying a cam follower 119 which, as in earlier embodiments of the invention, is adapted to be contacted by a cam, such as the cam 75 shown in FIGURE 1.

As in the earlier embodiments of the invention, the spout structure is provided with a centering bell 120 supported by lift rods 121 which mount a bar 122 at their upper ends, the bar having an opening 123 through which the rod 109 passes, the rod being provided with one or more lock nuts 124 positioned to be contacted by the bar 122. As in the case of the other embodiments, the lift rods 121 mount a cross member 125 carrying a cam follower 126 which, is arranged to be contacted by the cam 69 (FIGURE 2) to open the product valve.

In the operation of the structure just described, opening movement of the valve 97 is initiated by the cam follower 126 which, acting through the lift rod 121 and cross bar 122, moves the rod 109 and the valve attached thereto upwardly, thereby bringing the magnetic member 111 into contact with the thumb screw 113. The magnetic member 111 is adjustable on the rod 109 to determine the open position of the valve; and in addition the thumb screw 113 may be turned for fine adjustment of the gap between magnetic member 111 and core 114. When the valve is open, product will flow through passageway 92 and into the filling stem. At the same time vacuum will be drawn through vacuum tube 102, passageway 99, port 108, annular passageway 106 and vacuum passageway 93. At the same time vacuum will be drawn on chamber 105 through the annular passageway and hence on diaphragm 104, although the holding force of 111 will be sufficient to overcome the vacuum tending to draw the diaphragm downwardly. However, when the product in the container being filled reaches the end of the vacuum tube, the flow of air into the vacuum tube will be cut-off and a vacuum surge is created effective to draw diaphragm 104 downwardly, thereby closing the valve and cutting off product flow. As the valve 97a moves downwardly, the larger port 108 will be cut-off, but vacuum will still be drawn through the smaller port 107, such vacuum being sufficient to draw off the overfill. The use of the smaller port has several advantages. It reduces the required capacity of the vacuum supply means and, if the flow of air through the vacuum tubes were rapid, a water spout effect would be created, with the result that the fill height would be slightly lower than the terminous of the vacuum tube. While this reduction in fill height is reasonably uniform from container to container, the stabilizing of the fill height will be more accurate if the flow of air is not so rapid.

The pivoted arm 118 and cam follower 119 provide a safety cut-off which assures the positive closing of the valve when the machine has reached a predetermined point in its operating cycle just prior to the lowering away of the container from the filling spouts.

Since the diaphragm does not have moving parts which might be fouled by filling material entering the chamber 105, the bleeder or vent valve 55 employed in the embodiment of FIGURE 3 is not required; and any product entering the chamber 105 will be ultimately drawn from the chamber through the vacuum passageway for return to the supply tank. It will be understood, of course, that the flexible diaphragm 104 may be replaced by a bellows if so desired.

FIGURE 14 illustrates a modification of the device of FIGURES 11 and 12 wherein the vacuum source is used as an indirect means for closing the product valve. That is, instead of the vacuum responsive means, such as the diaphragm 104, acting directly upon the product valve, the vacuum sensing means may be utilized to actuate other mechanism effective to close the product valve. Thus, the body block 90 may be provided with a vacuum passageway 127 in communication with annular passageway 106, the passageway 127 opening into a relatively large diameter cylinder 128 having a piston 129 biased toward its uppermost position by a spring 130. The piston is connected through linkage 131 to a pivoted finger 132 which engages a spring biased detent 133 arranged to engage a notch 134 in the product valve rod 135 when the rod is in its uppermost position. The detent, when in engagement with the notch, serves to hold the product valve open against the compression of spring 136 acting to urge the valve toward its closed position.

With this arrangement, the vacuum surge in the vacuum passageway created when the product reaches the end of the vacuum tube will act to draw the piston 129 downwardly, thereby moving finger 132 to release detent 133 and in turn freeing valve rod 35 for closing movement under the influence of spring 136.

While for most uses the filling stem and vacuum tube will terminate at substantially the same lower level, thereby utilizing the vacuum tube to prevent dripping; there are nevertheless instances wherein it is advantageous to have the product flow orifice or outlet lower in the container than the desired fill height. Such an arrangement is illustrated in FIGURE 13 wherein it will be seen that the filling stem 137 projects downwardly into the container 138, whereas vacuum tube 139 terminates in a side outlet 140 which, as before, will determine the ultimate height of fill.

FIGURES 11, 12 and 13 also serve to illustrate a changeable adaptor 141 for making resilient contact with the mouth and/or shoulders of the containers being filled. Such an adaptor may be provided in various sizes to accommodate different size containers, the adaptors being preferably formed from a resilient material and held in place by means of an opposed pair of spring members 142 extending along opposite sides of the centering bell, the adaptor having a recess or channel 143 in which the springs are received.

FIGURE 15 illustrates a modification of the lifting cam 69 which initiates opening movement of the product valve, the cam in this instance being retractable to inoperative position by means of a fluid actuated cylinder 144 to which fluid, such as air under pressure, is supplied through conduit 145. The cam 69 is normally urged to its innermost or operative position by the spring 146; but should the machine be stopped for any reason, as by opening motor control switch 147, the solenoid 148 will be deenergized thereby opening normally closed valve 149 in conduit 145 and permitting fluid to enter cylinder 144, thereby moving the cam member 69 to its outermost or inoperative position. This prevents the discharge of product through the spout structure in engagement with the lift cam at the time the machine stops. When the motor control switch is again closed, the valve 149 will close and the cylinder 144 will be evacuated thereby permitting the cam to return to its operative position.

It should be apparent from the foregoing that in all modifications of the invention a combination of pressure and vacuum is utilized to obtain an accurate fill and yet it is not necessary that the container be sealed. The devices are positive in action in that the product valve is opened by positive action of a cam member, and yet the valve will remain closed in the event no container is presented to the filling stem. Positive shut-off of the product valve is also obtained, either by vacuum responsive means and/or means contacting and closing the stem of the product valve. The vacuum is operative at all times and in addition to sensing the fill height of the product, serves to remove the overfill and establish a uniform level of fill for all containers.

While the invention is primarily intended for introducing liquid products into containers, its utility is not so limited and it has been found that powdered or granular materials may be successfully handled where such materials are rendered "fluid" by being dispersed in a stream of air under pressure which is passed through the filling tube.

Having thus described the invention in several exemplary embodiments, what is desired to be secured and protected by Letters Patent is:

1. In a machine for filling containers, a filling spout structure having a body, a nozzle projecting downwardly from said body, said nozzle comprising a filling stem and a vacuum tube having an opening therein positioned to determine the fill height of a container presented thereto for filling, a first passageway in said body connecting said filling stem to a source of product under pressure, a second passageway in said body connecting said vacuum tube to a continuous source of vacuum, a valve in said first passageway movable from a passageway closing position to an open position, a valve stem projecting from said body for moving said valve from the closed to the opened position, means engaging said valve stem and operative upon presentation of a container to said filling spout structure to move said valve from the closed to the opened position, means for releasably securing said valve in the opened position, and vacuum responsive means operatively connected to said valve stem for returning said valve to the closed position, and a vacuum connection between said vacuum responsive means and said second passageway in said body, whereby when the level of product in the container being filled reaches and closes the opening in said vacuum tube, a vacuum surge will be created through said connection effective to actuate said vacuum responsive means and close said valve, said vacuum tube acting to thereafter withdraw over-fill from the container being filled and establish a fill height coinciding with the opening in said vacuum tube.

2. The structure claimed in claim 1 wherein said vacuum responsive means comprises a diaphragm secured to said valve stem.

3. The structure claimed in claim 1 including a restrictor bushing in said vacuum passageway having a flow area substantially equal to the effective flow area of the opening at the end of said vacuum tube.

4. The structure claimed in claim 1 wherein said vacuum responsive means comprises a piston secured to said valve stem, said piston being movable in a cylindrical chamber in said body, and wherein a branch passageway in said body connects said cylindrical chamber to said vacuum passageway.

5. The structure claimed in claim 4 including means in communication with said cylindrical chamber for venting said chamber upon movement of said valve from the closed to the open position.

6. The structure claimed in claim 5 wherein the means for venting said chamber comprises a second valve element having an upwardly projecting valve stem, said last named valve stem being operatively connected to the means for opening said first named valve upon the presentation of a container to said filling spout structure.

7. The structure claimed in claim 6 wherein the means for opening said valves comprise a plate movable relative to said valve stems, said valve stems having means thereon for engagement by said plate as it is moved, and means for moving said plate.

8. In a container filling machine for introducing a liquid product into a container with the mouth of the container open to the flow of air therethrough during the filling operation, a filling spout structure having a body, a filling nozzle projecting downwardly from said body and of a size to freely enter a container to be filled, said nozzle comprising a pair of tubes each having a lower opening therein, a first passageway in said body connecting the first of said tubes to a source of product under pressure, a second passageway in said body connecting the second of said tubes to a source producing a continuous flow of air through said second tube at a controlled rate of flow, a valve in said first passageway movable from a passageway closing position to an open position, a valve stem projecting from said valve for moving it from the closed to the open position, means engaging said projecting valve stem and operative upon the presentation of a container to said filling spout structure to move said valve stem and the valve connected thereto from the closed to the open position, valve stem engaging means for releasably securing said valve stem in the open position, pressure responsive means operatively connected to said valve stem for releasing said valve stem from said valve stem engaging means and returning said valve to the closed position, and a third passageway connecting said second passageway to said pressure responsive means, whereby when the level of product in the container being filled reaches and closes the opening in said second tube to the free flow of air therethrough, a pressure differential will be created in said second and third passageways effective to actuate said pressure responsive means to close said valve.

9. The structure claimed in claim 8 wherein said valve stem engaging means comprises a magnetic member operative, upon movement of said valve stem to the open position, to magnetically secure said valve stem in the open position.

10. The structure claimed in claim 9 wherein a first magnetic member is secured to said valve stem for movement therewith, wherein a second magnetic member is fixedly mounted relative to said valve stem and positioned to be contacted by said first magnetic member upon movement of said valve stem to the open position, and wherein at least one of said magnetic members is adjustably mounted for movement toward and away from the other of said magnetic members.

11. The structure claimed in claim 9 wherein said valve stem is threaded, wherein a first magnetic member is in threaded engagement with said valve stem, said first magnetic member having a plurality of fingers of opposite polarity, and wherein a non-magnetic thumbscrew in threaded engagement with a magnetic core member is positioned to be operatively engaged by the fingers of said first named magnetic member upon movement of said valve stem to the open position.

12. The structure claimed in claim 8 wherein said valve stem engaging means comprises a detent positioned to engage a depression in said valve stem.

13. In a rotary filling machine for introducing a liquid product into containers with the mouths of the containers open to the flow of air therethrough during the filling operation, a rotating head mounting a plurality of filling spout structures radially disposed about said head for movement therewith, means moving with said head for presenting containers to be filled to said filling spout structures, each of said filling spout structures having a body, a filling nozzle projecting downwardly from said body and of a size to freely enter a container to be filled, said nozzle comprising a pair of tubes each having an opening therein, a first passageway in said body connecting the first of said tubes to a source of product under pressure, a second passageway in said body connecting the second of said tubes to a source producing a continuous flow of air through said second tube at a controlled rate of flow, a valve in said first passageway movable from a passageway closing position to an open position, a valve stem projecting from said valve for moving it from the closed to the open position, means operatively connected to said valve stem for moving said valve stem and valve connected thereto from the closed to the open position upon the presentation of a container to said filling spout structure, valve stem engaging means for releasably securing said valve stem in the open position, pressure responsive means operatively connected to said valve stem for releasing said valve stem engaging means and returning said valve to the closed position, and a third passageway connecting said second passageway to said pressure responsive means, said pressure responsive means being responsive to a pressure differential created in said second tube when the level of product in the container being filled reaches and closes the opening in said second tube and acting to move said valve stem to the closed position with a force sufficient to overcome the holding force of said valve stem engaging means.

14. The structure claimed in claim 13 wherein said pressure responsive means comprises a diaphragm secured to said valve stem with the periphery of said diaphragm sealed to the mouth of a cup-shaped member forming a part of said filling spout structure, said diaphragm and said cup-shaped member defining a pressure chamber, and wherein said third passageway extends from said pressure chamber to said second passageway.

15. The structure claimed in claim 13 wherein said pressure responsive means comprises a piston surrounding and secured to said valve stem, a cylindrical bore in the body of said filling spout structure in which said piston is slidably received, said piston and bore defining a pressure chamber in communication with said second passageway.

16. The structure claimed in claim 13 wherein the means for moving said valve stem to the open position upon the presentation of a container to said filling spout structure comprises a centering bell surrounding said nozzle and mounted for upwards movement upon contact with a container to be filled, and means operative upon the upward movement of said centering bell to engage and move said valve stem from the closed to the open position.

17. The structure claimed in claim 16 wherein a cam follower is operatively connected to said centering bell, wherein the upward movement of said centering bell by a container presented thereto acts to position said cam follower for contact by a cam track which acts to move said valve stem from the closed to the open position.

18. A process for introducing a liquid product into a container with the mouth of the container open to the flow of air therethrough during the filling operation, which comprises providing a filling spout structure having a nozzle composed of a pair of tubes each having a lower opening therein, with one of the tubes connected to a source of product under pressure and the other of the tubes connected to a source producing a continuous uni-directional flow of air therethrough, presenting a container to be filled to said nozzle with the opening in the air tube positioned at the desired height of fill for the container, opening the product tube to the flow of product therethrough, and utilizing the flow of air through the air tube to sense the fill of the container and shut off the flow of product when the fill reaches the opening in the air tube, including the step of maintaining the uni-directional flow of air through said air tube after the product flow has been shut off.

19. A process claimed in claim 18 which includes the subsequent step of diminishing the flow of air through said air tube, whereby the flow of air through said air tube is greater when product is being introduced into the container being filled than it is when the product flow is shut off.

References Cited in the file of this patent

UNITED STATES PATENTS

| | | |
|---|---|---|
| 1,697,201 | Muller | Jan. 1, 1929 |
| 1,763,240 | Kiefer | June 10, 1930 |
| 1,814,168 | Leonard | July 14, 1931 |
| 2,071,006 | Urschel | Feb. 17, 1937 |
| 2,221,435 | Preston et al. | Nov. 12, 1940 |
| 2,222,923 | Warrick | Nov. 26, 1940 |
| 2,326,415 | Titus | Aug. 10, 1943 |
| 2,402,036 | Giger | June 11, 1946 |
| 2,509,756 | Berthelsen | May 30, 1950 |
| 2,660,350 | Fechheimer | Nov. 24, 1953 |
| 2,660,357 | Fechheimer | Nov. 24, 1953 |
| 2,660,358 | Fechheimer | Nov. 24, 1953 |
| 2,796,090 | Carriol | June 18, 1957 |
| 2,930,414 | Ring | Mar. 29, 1960 |

FOREIGN PATENTS

| | | |
|---|---|---|
| 695,055 | France | Sept. 23, 1930 |